United States Patent [19]

Nagai et al.

[11] Patent Number: 5,143,974
[45] Date of Patent: Sep. 1, 1992

[54] LOW-PROFILE UNSATURATED POLYESTER RESIN COMPOSITION

[75] Inventors: Kenji Nagai, Aichi; Kyosuke Fukushi, Kuwana; Kazuo Matsuyama, Gamagouri, all of Japan

[73] Assignee: Nippon Oil & Fats Co., Ltd., Tokyo, Japan

[21] Appl. No.: 565,698

[22] Filed: Aug. 13, 1990

[30] Foreign Application Priority Data

Aug. 24, 1989 [JP] Japan .................................. 1-215935

[51] Int. Cl.$^5$ .............................................. C08L 67/06
[52] U.S. Cl. ...................................... 525/92; 525/170; 525/299
[58] Field of Search .......................................... 525/92

[56] References Cited

U.S. PATENT DOCUMENTS 4,303,762 12/1981 Nakayama ............................ 525/92

FOREIGN PATENT DOCUMENTS 20150624 8/1985 European Pat. Off. .
0231881 8/1987 European Pat. Off. .

OTHER PUBLICATIONS

Derwent Accession No. 90-236 646, Questel Telesystems (WPIL) Derwent Publications Ltd., London *Abstract* & JP-A-02 166 109 (Nippon Oil & Fats KK).

Primary Examiner—Patricia A. Short
Attorney, Agent, or Firm—Oblon, Spivak, McClelland, Maier & Neustadt

[57] ABSTRACT

A low-profile unsaturated polyester resin composition, consisting essentially of (A) an unsaturated polyester, (B) a monomer copolymerizable with the unsaturated polyester, and (C) an A-B type block copolymer comprising an A segment which is a product using vinyl acetate and butyl acrylate as raw materials and a B segment which is a product solely of styrene or a product using styrene and a monomer copolymerizable with styrene as raw materials.

5 Claims, No Drawings

LOW-PROFILE UNSATURATED POLYESTER RESIN COMPOSITION

BACKGROUND OF THE INVENTION

1. Field of the Invention

This invention relates to a low-profile unsaturated polyester resin composition which shrinks only sparingly in curing and allows production of a shaped article excelling in dimensional stability, surface property, and shock resistance.

The fiber-reinforced plastic (FRP) materials produced by incorporating such a fibrous reinforcing material as glass fibers in unsaturated polyester resin and curing the resultant composite material are excellent in mechanical strength, chemical resistance, heat resistance, and waterproofness. Owing to these outstanding characteristics, they find extensive utility in household commodities such as bathtubs, sewage tanks, and water tank panels, and automobile parts, electric parts, and other industrial materials.

2. Prior Art Statement

The trend in automobiles in recent years has been toward lower in weight and design diversification. Efforts are being made to realize adoption of FRP's in such automobile outer panels as engine hoods, roofs, and trunk lids and such exterior parts as spoilers and air-intakes. For the production of these parts, sheet molding compounds (SMC) or bulk molding compounds (BMC) which excel in workability and moldability are generally used. These shaped articles are desired to be further enhanced in dimensional stability, shock resistance, and surface property.

Unsaturated polyester resins generally shrink to a large extent in curing. The shaped articles of such resins, therefore, are liable to develop cracks, warps, undulations, and protrusion of the glass fibers used therein for reinforcement. For the purpose of overcoming these drawbacks, the practice of incorporating in the unsaturated polyester resins such thermoplastic resins as polystyrene, polymethyl methacrylate, and polyvinyl acetate as shrinkage inhibitor has been common.

As regards conventional measures for the improvement of unsaturated polyester resins in shock resistance and surface property, the most basic method comprises incorporating thermoplastic elastomers, typically a styrene-butadiene block copolymer, in the unsaturated polyester resins. Japanese Patent Public Disclosure SHO 48(1973)-34289 and Japanese Patent Public Disclosure SHO 49(1974)-30480, for example, disclose methods which incorporate a styrene-butadiene block copolymer in the unsaturated polyester resins. In these methods, however, rapid separation of the thermoplastic elastomer occurs while the various component materials are being blended or while the produced composition is being used as a molding material such as SMC. As a result, the resultant composition loses uniformity and the separated elastomer soils the metallic mold and produces scumming on the surface of a shaped article.

For the purpose of overcoming this drawback, Japanese Patent Public Disclosure SHO 52(1977)-148588 and Japanese Patent Public Disclosure SHO 54(1979)-130653 propose methods for the incorporation of a styrene-butadiene block copolymer containing a carboxyl group or a salt thereof at the molecular terminal thereof in the unsaturated polyester resin while Japanese Patent Publication SHO 62(1987)-16202 and Japanese Patent Publication SHO 62(1987)-16222 propose methods for the incorporation of a modified block copolymer obtained by binding a dicarboxylic acid group and/or a derivative group thereof to a styrene-butadiene block copolymer in the unsaturated polyester resin. These methods, however, are still incapable of completely solving the problem of layer separation between the thermoplastic elastomer component and the unsaturated polyester component.

Besides, the method of solving the problem of layer separation between the thermoplastic elastomer component and the unsaturated polyester component by the incorporation of a compatibilizer as a third component has been proposed. For example, Japanese Patent Public Disclosure SHO 55(1980)-135120 proposes a method for combined use of a comb-shaped copolymer consisting of polystyrene (backbone)-saturated polyester (branch) with a styrene-butadiene block copolymer. This method, however, provides substantially no solution to the problem of layer separation.

In the circumstances, the present inventors in Japanese Patent Public Disclosure SHO 58(1983)-189214 proposed a method for solving the problem of layer separation of a thermoplastic elastomer by the use of a block copolymer of polyvinyl acetate with poly(-styrene+methacrylic acid) as a compatibilizer. This method is recognized to be effective to a certain extent in preventing the layer separation. Since it requires use of a large amount of a block copolymer deficient in toughness as a copatibilizer, it is incapable of producing a composition allowing formation of a shaped article improved in shock resistance and surface property.

There is a need for a low-profile unsaturated polyester resin composition which shrinks only sparingly in curing and allows production of a shaped article excelling in dimensional stability, surface property, and shock resistance.

SUMMARY OF THE INVENTION

This invention has been perfected as the result of a study conducted for the purpose of satisfying this need. To be specific, this invention is directed to a resin composition having incorporated a block copolymer containing in one of the segments thereof a rubber component, specifically butyl acrylate, and excelling in compatibility with the resin in an unsaturated polyester resin. It concerns a low-profile unsaturated polyester resin composition which shrinks only sparingly in curing and allows manufacture of a shaped article excelling in shock resistance and surface property.

To be specific, this invention relates to a low-profile unsaturated polyester resin composition, comprising (A) an unsaturated polyester, (B) a monomer copolymerizable with the unsaturated polyester, and (C) an A-B type block copolymer, providing that the weight ratio of (A) the unsaturated polyester to (B) the monomer is in the range of 20:80 to 70:30, (C) the A-B type block copolymer has a number average molecular weight in the range of 10,000 to 200,000 and accounts for a proportion in the range of 3 to 27% by weight, based on the total amount of (A) the unsaturated polyester and (B) the monomer, the weight ratio of the A segment to the B segment in (C) the A-B type block copolymer is in the range of 95:5 to 5:95, the A segment is a product of a mixture consisting of vinyl acetate and butylacrylate in a weight ratio in the range of 25:75 to 95:5, and the B segment is a product of a mixture consisting of styrene and a monomer copolymerizable with styrene in a mixing ratio in the range of 100:0 to 70:30.

DETAILED DESCRIPTION OF THE PREFERRED EMBODIMENTS

The unsaturated polyester (A) to be used in the low-profile unsaturated polyester resin composition of the present invention mentioned above is an ordinary unsaturated polyester, which is produced from an $\alpha,\beta$-unsaturated dibasic acid, a saturated dibasic acid, and a glycol.

The $\alpha,\beta$-unsaturated dibasic acids which are usable herein include maleic anhydride, maleic acid, fumaric acid, mesaconic acid, tetracosanoic acid, itaconic acid, and alkyl esters thereof, for example.

The saturated dibasic acids which are usable herein include phthalic anhydride, orthophthalic acid, isophthalic acid, terephthalic acid, tetrahydrophthalic acid, halogenated phthalic anhydride, adipic acid, succinic acid, sebacic acid, and alkyl esters thereof, for example.

The glycols which are usable herein include ethylene glycol, diethylene glycol, propylene glycol, dipropylene glycol, butylene glycol, neopentyl glycol, hexylene glycol, hydrogenated bis-phenol A, 2,2'-di(4-hydroxypropoxyphenyl) propane, 2, 2-di(4 -hydroxyethoxyphenyl)propane, ethylene oxide, and propylene oxide, for example.

The monomers which are copolymerizable with the unsaturated polyester (A) include alkenyl aromatic monomers such as styrene, $\alpha$-methyl styrene, and t-butyl styrene, alkyl esters of acrylic acid and methacrylic acid, and vinyl acetate, for example. Among the monomers mentioned above, styrene proves to be particularly desirable.

In the A-B type block copolymer which serves as a shrinkage inhibitor in the present invention, the A segment is produced from a monomer mixture consisting of vinyl acetate monomer and butyl acrylate monomer. The proportion of the portion of the A segment originating in the vinyl acetate monomer is in the range of 25 to 95% by weight and that of the portion thereof originating in the butyl acrylate monomer in the range of 75 to 5% by weight. If the proportion of the portion originating in the vinyl acetate monomer is less than 25% by weight, the dispersion stability of the A-B type block copolymer (C) in the unsaturated polyester resin is inferior and the shaped article manufactured from the unsaturated polyester resin composition incorporating the A-B type block copolymer entails surface scumming and mold clouding and suffers from low shock resistance. Conversely, if this proportion exceeds 95% by weight, the shaped article is deficient in shock resistance and surface property. The proportion of the portion originating in the vinyl acetate monomer preferably is in the range of 50 to 80% by weight.

The B segment is produced either solely from styrene monomer or from a monomer mixture consisting of styrene monomer and a monomer copolymerizable therewith.

The monomer which is copolymerizable with the styrene monomer is desired to be one member or a combination of two or more members selected from the group consisting of (meth)acrylic acids, alkyl (meth)acrylates such as methyl (meth)acrylates, ethyl (meth)acrylates, and n-butyl (meth)acrylates, nitriles such as acrylonitrile and methacrylonitrile, styrene derivatives, and derivatives of fumaric acid and maleic acid. In all of the copolymerizable monomers mentioned above, (meth)acrylic acids prove to be most desirable. The amount of the aforementioned monomer copolymerizable with the styrene monomer to be used is limited to not more than 30% by weight. If this amount exceeds 30% by weight, the shaped article made of the unsaturated polyester resin composition incorporating therein the A-B type block copolymer (C) is deficient in mechanical strength. The styrene monomer content of the B segment is desired to be in the range of 85 to 100% by weight.

The aforementioned A-B type block copolymer (C) is composed of 5 to 95% by weight of the A segment and 95 to 5% by weight of the B segment. If the proportion of the A segment is less than 5% by weight, the dispersion stability of the A-B type block copolymer (C) in the unsaturated polyester resin is inferior and, as the result, the shaped article formed of the unsaturated polyester resin composition not only entails such adverse phenomena as surface scumming and mold clouding but also suffers from deficiency in dimensional stability, shock resistance, and surface property. Conversely, if the proportion exceeds 95% by weight, the shaped article suffers from degradation of shock resistance. The proportion of the A segment is desired to be in the range of 25 to 75% by weight and that of the B segment in the range of 75 to 25% by weight.

The number average molecular weight of the A-B type block copolymer is in the range of 10,000 to 200,000, preferably 30,000 to 100,000. If this number average molecular weight is less than 10,000, the shaped article made of the unsaturated polyester resin composition is deficient in dimensional stability, shock resistance, and surface property. If it exceeds 200,000, the unsaturated polyester resin composition obtained by incorporating this A-B type block copolymer gains in viscosity to the extent of rendering practical use difficult.

The amount of the A-B type block copolymer (C) to be effectively used is in the range of 3 to 27 parts by weight, based on the total amount, 100 parts by weight, of the unsaturated polyester (A) and the monomer (B) copolymerizable therewith. If this amount is less than 3 parts by weight, the shaped article formed of the unsaturated polyester · resin composition incorporating therein this A-B type block copolymer (C) is deficient in dimensional stability, shock resistance, and surface property. If the amount exceeds 27 parts by weight, the unsaturated polyester resin composition gains in viscosity and is unfit for practical use.

The A-B type block copolymer to be used in the present invention can be easily produced by subjecting the monomer or monomer mixture destined to form the aforementioned A or B segment to two-step polymerization by the known bulk polymerization, suspension polymerization, or emulsion polymerization using a polymeric peroxide. The polymer which is produced by the first-step polymerization of the monomer or monomer mixture destined to form the A or B segment possesses a peroxy bond and may be taken out of the reaction system as an intermediate and used as the raw material for the subsequent production of the block copolymer or may be left in the reaction system and allowed to participate in the subsequent block copolymerization.

The polymeric peroxides which are usable effectively in the present invention are those represented by the following structural formulas (I), (II), and (III):

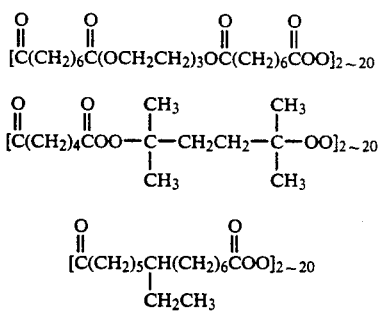

The amount of such a polymeric peroxide to be used in the production of the A-B type block copolymer is desired to be in the range of 0.1 to 10 parts by weight, based on 100 parts by weight of the monomer or monomer mixture destined to form the aforementioned A or B segment.

The polymerization temperature for the first-step polymerization is desired to be in the range of 40° to 80° C. and that for the second-step polymerization in the range of 60° to 120° C., provided that the polymerization temperature in the first-step polymerization should be lower than that in the second-step polymerization.

The monomer mixture destined to form the A segment may be added to the reaction system collectively, portionwise, or continuously. Preferably, this addition is made portionwise or continuously. In the case of the continuous addition, the time spent for the addition is desired to be in the range of 15 to 90 minutes, though it is variable with the mixing ratio of the two monomers as the components of the A segment. The polymerization time for the first-step polymerization and that for the second-step polymerization are both desired to be in the range of 2 to 10 hours, though they are variable with the kinds of monomers and the amounts of such monomers to be used.

The production of the A-B type block copolymer may possibly entail by-production of homopolymers of the component monomers or an random copolymer of the monomer mixture. When the A-B type block copolymer so defiled with the by-products is to be used as a shrinkage inhibitor for the unsaturated polyester resin of the present invention, it need not be particularly refined but may be used in its defiled state.

The production of the copolymer from the vinyl acetate monomer and the butyl acrylate monomer for the formation of the A segment has the possibility of entailing the formation of the homopolymer of one of the monomers and consequently by-producing an A'-B type block copolymer consisting of an A' segment formed of the aforementioned one monomer and a B segment formed mainly of styrene monomer. When the A-B type block copolymer so defiled with the by-products is to be used as a shrinkage inhibitor for the unsaturated polyester resin of the present invention, it need not be particularly refined but may be used in its defiled state.

The proportion of the block copolymer to the whole polymer synthesized in accordance with the aforementioned method of production, namely, the block ratio, can be found from the weight ratio of the residue remaining after the separation by fractional extraction of the non-block copolymer such as the aforementioned homopolymer and the random copolymer to the whole polymer.

The fact that the vinyl acetate monomer and the butyl acrylate monomer have formed the A segment in consequence of their copolymerization has been confirmed as follows. The polymer containing a peroxy bond in the molecular unit thereof and formed by the first-step polymerization of the monomer mixture destined to form the A segment was taken out of the reaction system and heat-treated in toluene to induce cleavage of the peroxy bond. The polymer so treated was analyzed by nuclear magnetic resonance spectroscopy to estimate the sequence of vinyl acetate and butyl acrylate. In this estimation, the established knowledge that the calculated value of chemical shift of methylene proton possessing two acetoxy groups at the beta position is 2.06 ppm, that of chemical shift of methylene proton possessing two butyl ester groups at the beta position is 1.82 ppm, and that of chemical shift of methylene proton possessing one acetoxy group and one butyl ester group at the beta position is 1.94 ppm justified the conclusion that the occurrence of the copolymerization between the vinyl acetate monomer and the butyl acrylate monomer was confirmed by the detection of a signal corresponding to 1.94 ppm by the nuclear magnetic resonance spectroscopy.

Further, the ratio of the contents, A segment and B segment, in the A-B type block copolymer which is the residue of extraction has been determined by nuclear magnetic resonance spectroscopy. To be specific, the ratio mentioned above can be determined in accordance with the ratio of the sum of the integrals of the signal serving as the index of the vinyl acetate monomer and the signal as the index of the butyl acrylate monomer destined to form the A segment to the integral of the signal serving as the index of the monomer formed mainly of styrene destined to form the B segment.

The low-profile unsaturated polyester resin composition of this invention can be used in its unmodified form in numerous uses with the aid of various known curing agents. When it is to be used as molding materials such as SMC, fillers such as calcium carbonate, calcium hydroxide, silicic anhydride powder, silica stone powder, and clay, thickening agents represented by oxides and hydroxides of alkaline earth metals such as magnesium oxide, calcium oxide, magnesium hydroxide, and calcium hydroxide or isocyanate compounds, internal mold-releasing agents such as zinc stearate and calcium stearate, fibrous reinforcing materials such as glass fibers and carbon fibers, and pigments and dyes may be additionally used. It is used ideally for the production of outer panels and exterior parts of automobiles which are required to excel in surface property and shock resistance, for example.

As described above, the low-profile unsaturated polyester resin composition of the present invention manifests various effects, such as in enabling the shrinkage inhibitor incorporated for the purpose of imparting toughness to be dispersed with high stability in the unsaturated polyester resin, exhibiting only sparing shrinkage in curing, and allowing manufacture of a shaped article markedly improved in shock resistance and surface property.

EXAMPLES

Now, the present invention will be described more specifically below with reference to referential examples, working examples, and comparative experiments. It should be noted, however, that the present invention is not limited to these examples. In these examples, the terms "part" and "%" refer to "part by weight" and "% by weight" unless otherwise specified.

REFERENTIAL EXAMPLE 1

Production Example 1 of A-B type block copolymer

In a reaction vessel made of glass and provided with a thermometer, a stirrer, and a condenser, 250 parts of an aqueous 1.0% polyvinyl alcohol solution was placed. Then, 2.4 parts of polymeric peroxide represented by the aforementioned structural formula (I) was dispersed in the aforementioned aqueous solution at room temperature over a period of 1 hour. The interior of the reaction vessel was kept displaced with nitrogen and, at the same time, heated to 65° C. The resultant dispersant which was kept stirred and a mixture of 45 parts of vinyl acetate with 3 parts of butyl acrylate which was added dropwise thereto over a period of about 30 minutes were left polymerizing (first-step polymerization) at the same temperature for 3 hours. Thereafter, the reaction solution cooled to room temperature and 52 parts of styrene added thereto were allowed to undergo an ensuing impregnation at room temperature for 1 hour and left polymerizing (second-step polymerization) as stirred at 80° C. for 4 hours. The resultant reaction solution was cooled to room temperature. The polymer consequently formed was separated by filtration, thoroughly washed with water, and then dried under a vacuum, to obtain 92 parts of a white pearly polymer.

In a Soxhlet extractor, part of the polymer was extracted first with cyclohexane for 24 hours and then with methanol for 24 hours. The loss of weight due to the extraction with cyclohexane was taken as the content of polystyrene, the loss of weight due to the extraction with methanol as the content of the mixture of polyvinyl acetate, polybutyl acrylate, and the copolymer of vinyl acetate and butyl acrylate, and the residue of extraction as the content of the A-B type block copolymer. Thus, the block ratio was found to be 77%.

By the gel permeation chromatography (hereinafter referred to as "GPC"), the number average molecular weight of the residue of extraction was found to be 56,000 as polystyrene. By the analysis of the residue of extraction in accordance with nuclear magnetic resonance spectroscopy, the ratio of the contents of A segment and B segment in the A-B type block copolymer (hereinafter referred as "A/B"), based on the ratio of the sum of the integrals of the signal corresponding to acetyl proton in the vinyl acetate composition (chemical shift $\delta = 2.06$ ppm) and the signal corresponding to methyl proton of the butyl ester group in the butyl acrylate composition (chemical shift $\delta = 0.96$ ppm) to the integral of the signal corresponding to the benzene ring proton in the styrene composition (chemical shift $\beta = 6.0$ to 7.2 ppm), was found to be about 50/50.

Separately, part of the polymer formed in the first-step polymerization was separated by filtration, dried under a vacuum, and then heat-treated in toluene to induce decomposition of the peroxide group. When the product of this decomposition was analyzed by the nuclear magnetic resonance spectroscopy, a signal was detected in the neighborhood of a chemical shift of 1.94 ppm. This signal corresponded to methylene proton possessing one acetoxy group and one butyl ester group at the beta position, indicating the occurrence of copolymerization of vinyl acetate and butyl acrylate.

REFERENTIAL EXAMPLES 2 TO 12

A-B type block copolymers were prepared by faithfully repeating the procedure of Referential Example 1, except that the amounts of polymeric peroxide, vinyl acetate, butyl acrylate, and styrene used were varied as indicated in Table 1 (provided that in Referential Example 5, 3 parts of methacrylic acid was used in addition to styrene). Consequently, white pearly polymers similar to the product of Referential Example 1 were obtained. These polymers were assayed in the same manner as in Referential Example 1 to determine the block ratio of A-B type block copolymer, number average molecular weight, and the ratio of contents, A/B, of A segment and B segment in the block copolymer. The results are shown in Table 1.

In each of the referential examples, the occurrence of copolymerization between vinyl acetate and butyl acrylate, the components of A segment, was confirmed in the same manner as in Referential Example 1.

TABLE 1

| | Resin composition conforming to the present invention | | | | | | | | Resin composition not conforming to the present invention | | | |
|---|---|---|---|---|---|---|---|---|---|---|---|---|
| Referential Example No. | 1 | 2 | 3 | 4 | 5 | 6 | 7 | 8 | 9 | 10 | 11 | 12 |
| Raw material used | | | | | | | | | | | | |
| Polymeric peroxide | 2.4 | 2.4 | 2.4 | 2.4 | 2.4 | 0.45 | 0.25 | 4.65 | 2.4 | 2.4 | 0.15 | 4.85 |
| Vinyl acetate | 45 | 38 | 24 | 12 | 38 | 7 | 4 | 74 | 10 | 47 | 2 | 78 |
| Butyl acrylate | 3 | 10 | 24 | 36 | 10 | 2 | 1 | 19 | 38 | 1 | 1 | 19 |
| Styrene | 52 | 52 | 52 | 52 | 49 | 91 | 95 | 7 | 52 | 52 | 97 | 3 |
| Methacrylic acid | — | — | — | — | 3 | — | — | — | — | — | — | — |
| White polymer | | | | | | | | | | | | |
| Amount produced (parts) | 92 | 94 | 90 | 91 | 93 | 92 | 90 | 94 | 91 | 93 | 92 | 90 |
| Block ratio (%) | 77 | 81 | 83 | 79 | 82 | 73 | 75 | 87 | 80 | 82 | 73 | 87 |
| Number average molecular weight | 56,000 | 55,000 | 48,000 | 43,000 | 54,000 | 65,000 | 63,000 | 68,000 | 41,000 | 58,000 | 64,000 | 72,000 |
| A/B | 50/50 | 50/50 | 50/50 | 50/50 | 50/50 | 10/90 | 5/95 | 95/5 | 50/50 | 50/50 | 3/97 | 97/3 |

*Referential Example 9: Weight proportion of vinyl acetate small
Referential Example 10: Weight proportion of butyl acrylate small
Referential Examples 11 and 12: A/B out of specified range

REFERENTIAL EXAMPLE 13

Production of unsaturated polyester resin

By the conventional method, 800 parts of maleic anhydride, 200 parts of isophthalic acid, and 1,100 parts of propylene glycol were subjected to esterification. The unsaturated polyester consequently obtained was diluted with styrene to a solid content of 65%, to produce an unsaturated polyester resin having an acid number of 18.0.

REFERENTIAL EXAMPLE 14

Preparation of shrinkage inhibitor for comparison (A) Styrene-butadiene-styrene block copolymer A styrene-butadiene-styrene block copolymer (produced by Shell Chemical K.K. and marketed under the tradename "Kraton D1300X") was dissolved in styrene in a concentration of 30%, to produce a shrinkage inhibitor (A) for comparison.

(B) Styrene-butadiene block copolymer containing terminal carboxyl group

In cyclohexane solvent, styrene and butadiene were subjected to sequential polymerization in the presence of n-butyl lithium as a polymerization catalyst. The resultant living polymer was allowed to be reacted on by carbon dioxide gas and then treated with hydrochloric acid, to produce a styrene-butadiene block copolymer possessing one terminal carboxyl group in the polymer unit and having a styrene content of 40% and a number average molecular weight of 65,000. This copolymer was dissolved in styrene in a concentration of 30%, to produce a shrinkage inhibitor (B) for comparison.

(C) Maleic anhydride-modified hydrogenated styrene-butadiene-styrene block copolymer A maleic anhydride-modified hydrogenated styrene-butadiene-styrene block copolymer (produced by Shell Chemical K.K. and marketed under the tradename "Kraton FG1901X") was dissolved in styrene in a concentration of 30%, to produce a shrinkage inhibitor (C) for comparison.

REFERENTIAL EXAMPLE 15

Preparation of compatibilizer (a) Acid-group-containing styrene-vinyl acetate block copolymer An acid group-containing styrene-vinyl acetate block copolymer of acid number of 29.8 (produced by NIPPON OIL & FATS CO., LTD. and marketed under the tradename "Modiper SV50A") was dispersed in styrene in a concentration of 30%, to produce a compatibilizer (a).

(b) Comb-shaped copolymer consisting of polystyrene (backbone)-saturated polyester (branch)

A dispersion stabilizer (milky opaque viscous liquid, produced by Kuraray Co., Ltd. and marketed as "Kurapearl S-25") was used as a compatibilizer (b).

EXAMPLES 1 TO 8

The A-B type block copolymers obtained in Referential Examples 1 to 8 were each dispersed in styrene in a concentration of 30%, to produce dispersions. These dispersions were mixed with the unsaturated polyester resin obtained in Referential Example 13 and formulated under the conditions shown in Table 2, to produce SMC's.

TABLE 2

| Raw material for SMC | Amount used (parts) | | |
|---|---|---|---|
| Unsaturated polyester resin | 70 | ... Unsaturated polyester<br>... Styrene<br>Unsaturated polyester:styrene = | 45.5<br>24.5<br>65:35 |
| Dispersion of A-B type block copolymer in syrene | 30 | ... A-B type block copolymer<br>... Styrene<br>$\dfrac{\text{A-B type block copolymer}}{\text{unsaturated polyester + styrene}} \times 100 = 9.89$ | 9<br>21 |
| Para-benzoquinone | 0.02 | | |
| Calcium carbonate | 150 | | |
| Zinc stearate | 4 | | |
| t-Butyl perbenzoate | 1.5 | | |
| Magnesium oxide | 3 | | |
| Glass fibers, Chopped strand, 1 inch (produced by Asahi Fiber Glass K.K.) | 70 | | |

The SMC's produced under the formulation conditions indicated above were left to age at 40° C. for 24 hours and then compression molded with a press under a molding pressure of 100 kg/cm², at a molding temperature of 140° C., for a molding time of 6 minutes, to produce shaped articles measuring 200×150×14 mm. The shaped articles were each tested for ratio of mold shrinkage, Izod impact strength, and waviness by the following methods. The results are shown in Table 3.

(1) Method for determination of ratio of mold shrinkage

In accordance with Japanese Industrial Standard (JIS)-K 6911 (Method for testing thermosetting plastics in general), a disc-like shaped article 90 mm in diameter and 11 mm in thickness was produced by compression molding using a press. The ratio of mold shrinkage was found in accordance with the following formula, using the inside diameter of the metal die and the size of the shaped article.

$$\text{Ratio of mold shrinkage (\%)} = \dfrac{[(\text{Inside diameter of metal die}) - (\text{size of shaped article})]}{(\text{Inside diameter of metal die})} \times 100$$

(2) Method for determination of Izod impact strength

In accordance with JIS-K 6911, a test piece cut from a given shaped article was tested for Izod impact strength (notched) by the use of an Izod impact tester (produced by Toyo Seiki Seisakusho K.K.).

(3) Method for determination of waviness

In accordance with JIS-B 0610 (Definition and indication of waviness), a given shaped article was tested for waviness by the use of an instrument (produced by Tokyo Seimitsu K. K. and marketed under the tradename "Surfcom 554A"). The waviness was reported with the longterm waviness determined by the JIS method.

(4) Mold clouding

The metal die immediately after release of a shaped article was visually inspected as to surface condition. The degree of mold clouding was rated on a three-point scale, i.e. "heavy", "discernible", and "absent".

TABLE 3

| Example No. | A-B type block copolymer | (1) Ratio of mold shrinkage (%) | (2) Izod impact strength (kgf · cm/cm) | (3) waviness (μm) | (4) Mold clouding |
| --- | --- | --- | --- | --- | --- |
| 1 | Ref. Ex. 1 | 0.107 | 39.8 | 35.8 | Absent |
| 2 | Ref. Ex. 2 | 0.096 | 43.7 | 32.1 | Absent |
| 3 | Ref. Ex. 3 | 0.075 | 41.2 | 29.3 | Absent |
| 4 | Ref. Ex. 4 | 0.062 | 40.5 | 28.7 | Absent |
| 5 | Ref. Ex. 5 | 0.091 | 43.4 | 31.6 | Absent |
| 6 | Ref. Ex. 6 | 0.116 | 39.3 | 38.5 | Absent |
| 7 | Ref. Ex. 7 | 0.123 | 38.1 | 40.4 | Absent |
| 8 | Ref. Ex. 8 | 0.079 | 40.0 | 30.9 | Absent |

EXAMPLES 9 TO 16

SMC's were produced under the formulation conditions of Table 2, except that the amount of the unsaturated polyester resin was changed to 50 parts (unsaturated polyester 32.5 parts and styrene 17.5 parts; unsaturated polyester:styrene=65:35) and that of the dispersion of the A-B type block copolymer in styrene to 50 parts (A-B block copolymer 15 parts and styrene 35 parts;

$$\frac{\text{A-B type block copolymer}}{\text{unsaturated polyester + styrene}} \times 100 = 17.65).$$

They were molded by the method indicated in Examples 1 to 8, to produce shaped articles (test pieces). These test pieces were tested. The results are shown in Table 4.

TABLE 4

| Example No. | A-B type block copolymer | (1) Ratio of mold shrinkage (%) | (2) Izod impact strength (kgf · cm/cm) | (3) waviness (μm) | (4) Mold clouding |
| --- | --- | --- | --- | --- | --- |
| 9  | Ref. Ex. 1 | 0.075 | 46.5 | 27.7 | Absent |
| 10 | Ref. Ex. 2 | 0.064 | 49.7 | 25.3 | Absent |
| 11 | Ref. Ex. 3 | 0.043 | 48.2 | 23.1 | Absent |
| 12 | Ref. Ex. 4 | 0.032 | 47.4 | 22.7 | Absent |
| 13 | Ref. Ex. 5 | 0.059 | 49.1 | 24.6 | Absent |
| 14 | Ref. Ex. 6 | 0.088 | 44.0 | 30.8 | Absent |
| 15 | Ref. Ex. 7 | 0.096 | 42.1 | 32.5 | Absent |
| 16 | Ref. Ex. 8 | 0.048 | 44.8 | 24.2 | Absent |

EXAMPLES 17 AND 18

SMC's were produced under the formulation conditions of Table 2, except that the amount of the unsaturated polyester resin was changed to 90 parts (unsaturated polyester 58.5 parts and styrene 31.5 parts; unsaturated polyester:styrene=65:35) and that of the dispersion of the A-B type block copolymer in styrene to 10 parts (A-B type block copolymer 3 parts and styrene 7 parts;

$$\frac{\text{A-B type block copolymer}}{\text{unsaturated polyester + styrene}} \times 100 = 3.09).$$

They were molded by the method indicated in Examples 1 to 8, to produce shaped articles (test pieces). These test pieces were tested. The results are shown in Table 5.

EXAMPLES 19 AND 20

SMC's were produced under the formulation conditions of Table 2, except that the amount of the unsaturated polyester resin was changed to 30 parts (unsaturated polyester 19.5 parts and styrene 10.5 parts; unsaturated polyester:styrene=65:35) and that of the dispersion of the A-B type block copolymer in styrene to 70 parts (A-B type block copolymer 21 parts and styrene 49 parts;

$$\frac{\text{A-B type block copolymer}}{\text{unsaturated polyester + styrene}} \times 100 = 26.58).$$

They were molded by the method indicated in Examples 1 to 8, to produce shaped articles (test pieces). These test pieces were tested. The results are shown in Table 5.

TABLE 5

| Example No. | A-B type block copolymer | (1) Ratio of mold shrinkage (%) | (2) Izod impact strength (kgf · cm/cm) | (3) waviness (μm) | (4) Mold clouding |
| --- | --- | --- | --- | --- | --- |
| 17 | Ref. Ex. 2 |  0.123 | 36.7 | 38.1 | Absent |
| 18 | Ref. Ex. 3 |  0.104 | 35.5 | 34.7 | Absent |
| 19 | Ref. Ex. 2 |  0.021 | 47.7 | 24.1 | Absent |
| 20 | Ref. Ex. 3 | −0.001 | 45.5 | 22.7 | Absent |

COMPARATIVE EXPERIMENT 1

A SMC was produced under the formulation conditions of Table 2, except that the amount of the unsaturated polyester resin was changed to 94 parts (unsaturated polyester 61.1 parts and styrene 32.9 parts; unsaturated polyester:styrene=65:35) and that the amount of the A-B type block copolymer dispersed in styrene to 6 parts (A-B type block copolymer 1.8 parts and styrene 4.2 parts;

$$\frac{\text{A-B type block copolymer}}{\text{unsaturated polyester + styrene}} \times 100 = 1.83).$$

This SMC was molded by the method indicated in Examples 1 to 8, to produce a shaped articles (test piece). The test piece was tested. From the results shown in Table 6, it is clearly noted that the shaped article had large ratio of mold shrinkage and heavy waviness was deficient in dimensional stability and surface property and exhibited weak Izod impact strength and insufficient shock resistance.

COMPARATIVE EXPERIMENT 2

An effort to produce a SMC under the formulation conditions of Table 2, except that the amount of the unsaturated polyester resin was changed to 20 parts (unsaturated polyester 13 parts and styrene 7 parts; unsaturated polyester:styrene=65:35) and the amount of the A-B type block copolymer dispersed in styrene to 80 parts (A-B type block copolymer 24 parts and styrene 56 parts;

$$\frac{\text{A-B type block copolymer}}{\text{unsaturated polyester + styrene}} \times 100 = 31.58)$$

failed to produce a SMC fit for practical use because the viscosity of the unsaturated polyester resin composition was too high and the mixture of the raw materials other than the glass fibers was incapable of impregnating the glass fibers.

COMPARATIVE EXPERIMENT 3

A SMC was produced under the formulation conditions of Table 2, except that the dispersion of the A-B type block copolymer in styrene obtained in Referential Example 9 was used instead. When this SMC was left to age at 40° C. for 24 hours, the protrusion of the dispersion of the A-B type block copolymer in styrene on the surface was visible. When a shaped article of this SMC was molded by following the procedure indicated in Examples 1 to 8, the shaped article betrayed surface scumming and the metal die showed mold clouding.

When this shaped article was tested for the various items indicated in Examples 1 to 8, it showed weak Izod impact strength and insufficient shock resistance as indicated in Table 6.

COMPARATIVE EXPERIMENT 4

A SMC was produced under the formulation conditions of Table 2, except that the dispersion of the A-B type block copolymer in styrene obtained in Referential Example 10 was used instead. A shaped article (test piece) of this SMC was molded by repeating the procedure of Examples 1 to 8 and tested. It is clearly noted from the results given in Table 6 that this shaped article showed large waviness, small Izod impact strength, and insufficient surface property and shock resistance.

COMPARATIVE EXPERIMENT 5

A SMC was produced under the formulation conditions of Table 2, except that the dispersion of the A-B type block copolymer in styrene obtained in Referential Example 11 was used instead. When this SMC was left to age at 40° C. for 24 hours, the protrusion of the dispersion of the A-B type block copolymer in styrene on the surface was visible. When a shaped article of this SMC was produced by the method indicated in Examples 1 to 8, the shaped article betrayed surface scumming and the metal die showed mold clouding.

When this shaped article was tested for the various items indicated in Examples 1 to 8, the ratio of mold shrinkage and the waviness were unduly large, the dimensional stability and the surface property were inferior, the Izod impact strength was small, and the shock resistance was insufficient, as noted from the results shown in Table 6.

COMPARATIVE EXPERIMENT 6

A SMC was produced under the formulation conditions of Table 2, except that the dispersion of the A-B type block copolymer in styrene obtained in Referential Example 12 was used instead. A shaped article (test piece) of the SMC was molded by following the procedure indicated in Examples 1 to 8. When this shaped article was tested for the various items, it was found to be satisfactory as to the ratio of mold shrinkage and the waviness but deficient in the Izod impact strength and the shock resistance, as shown in Table 6.

TABLE 6

| Comparative Experiment No. | A-B type block copolymer | (1) Ratio of mold shrinkage (%) | (2) Izod impact strength (kgf · cm/cm) | (3) waviness (μm) | (4) Mold clouding |
|---|---|---|---|---|---|
| 1 | Ref. Ex. 2 | 0.175 | 29.8 | 75.8 | Absent |
| 3 | Ref. Ex. 9 | 0.060 | 31.7 | 42.1 | Discernible |
| 4 | Ref. Ex. 10 | 0.113 | 30.2 | 54.3 | Absent |
| 5 | Ref. Ex. 11 | 0.162 | 28.5 | 98.7 | Discernible |
| 6 | Ref. Ex. 12 | 0.074 | 31.4 | 30.6 | Absent |

COMPARATIVE EXPERIMENTS 7 TO 9

SMC's were produced under the formulation conditions of Table 2, except that the shrinkage inhibitors for comparison (A) to (C) obtained in Referential Example 14 were used in place of the dispersion of the A-B type block copolymer in styrene. These SMC's were left to age at 40° C. for 24 hours. The SMC using the shrinkage inhibitor (A) for comparison betrayed serious protrusion on the surface and the shaped article of this SMC showed surface scumming and the metal die revealed heavy mold clouding. This shaped article (test piece) was tested for the various items indicated in Examples 1 to 8. It is clearly noted from the results of Table 7 that the waviness was heavy, the Izod impact strength was small, and the surface property and the shock resistance were not improved sufficiently.

In contrast, in the SMC's using the shrinkage inhibitors (B) and (C) for comparison, the layer separation during the course of SMC aging appeared to be suppressed to a certain extent. The shaped articles of these SMC's nevertheless induced surface scumming. When these shaped articles were tested for the various items indicated in Examples 1 to 8, the surface property and the shock resistance were found not to be sufficiently improved, as shown in Table 7.

TABLE 2

| Comparative Experiment No. | Shrinkage inhibitor for comparison | (1) Ratio of mold shrinkage (%) | (2) Izod impact strength (kgf · cm/cm) | (3) waviness (μm) | (4) Mold clouding |
|---|---|---|---|---|---|
| 7 | (A) | 0.077 | 31.8 | 63.8 | Heavy |
| 8 | (B) | 0.079 | 32.7 | 62.1 | Discernible |
| 9 | (C) | 0.075 | 33.2 | 59.3 | Discernible |

COMPARATIVE EXPERIMENTS 10 AND 11

A SMC was produced under the formulation conditions of Table 2, except that 15 parts of the shrinkage inhibitor (A) obtained in Referential Examples 14 and 15 parts of the compatibilizer (a) obtained in Referential Example 15 were used in place of 30 parts of the dispersion of the A-B type block copolymer in styrene. When the SMC was left to age at 40° C. for 24 hours, the protrusion on the surface was not visible and the mold clouding and the surface scumming hardly occurred. When the shaped article (test piece) was tested for the various items indicated in Examples 1 to 8, the waviness was heavy, the Izod impact strength was small, and the surface property and the shock resistance were not improved sufficiently as shown in Table 8.

Separately, a SMC was produced under the formulation conditions of Table 2, except that 30 parts of the shrinkage inhibitor (A) for comparison obtained in Referential Example 14 and 4 parts of the compatibilizer (b) obtained in Referential Example 15 were used in place of 30 parts of the dispersion of the A-B type block copolymer in styrene. When this SMC was left to age at 40° C. for 24 hours, the protrusion on the surface was visible and the surface scumming and the mold clouding occurred. When the shaped article (test piece) was tested for the various items indicated in Examples 1 to 8, the waviness was heavy, the Izod impact strength was small, and the surface property and the shock resistance were not improved sufficiently, as shown in Table 8.

TABLE 8

|  | Comparative Experiment No. | |
| --- | --- | --- |
|  | 10 | 11 |
| Shrinkage inhibitor for comparison | (A) | (A) |
| Compatibilizer | (a) | (b) |
| (1) Ratio of mold shrinkage (%) | 0.085 | 0.080 |
| (2) Izod impact strength (kgf · cm/cm) | 29.8 | 31.7 |
| (3) Waviness (μm) | 54.8 | 62.1 |
| (4) Mold clouding | Absent | Discernible |

Comparison of the results of Examples 1 to 20 (Tables 3 to 5) with those of Comparative Experiments 1 to 11 (Tables 6 to 8) clearly reveals that the low-profile unsaturated polyester resin composition of the present invention allows manufacture of a shaped article which shrinks only sparingly in curing and excels in surface property and shock resistance.

What is claimed is:

1. A low-profile unsaturated polyester resin composition, consisting essentially of (A) an unsaturated polyester, (B) a monomer copolymerizable with said unsaturated polyester, and (C) an A-B type block copolymer, provided that the weight ratio of (A) said unsaturated polyester to (B) said monomer is in the range of 20:80 to 70:30, (C) said A-B type block copolymer has a number average molecular weight in the range of 10,000 to 200,000 and accounts for a proportion in the range of 3 to 27% by weight, based on the total amount of (A) said unsaturated polyester and (B) said monomer, the weight ratio of the A segment to the B segment in (C) said A-B type block copolymer is in the range of 95:5 to 5:95, said A segment is a product of a mixture consisting of vinyl acetate and butylacrylate in a weight ratio in the range of 25:75 to 95:5, and said B segment is a product of a mixture consisting of styrene and a monomer copolymerizable with styrene in a mixing ratio in the range of 100:0 to 70:30.

2. A low-profile unsaturated polyester resin composition according to claim 1, wherein said monomer copolymerizable with said unsaturated polyester is at least one member selected from the group consisting of styrene, α-methyl styrene, t-butyl styrene, alkyl esters of acrylic acid, alkyl esters of methacrylic acid, and vinyl acetate.

3. A low-profile unsaturated polyester resin composition according to claim 2, wherein said monomer copolymerizable with said unsaturated polyester is styrene.

4. A low-profile unsaturated polyester resin composition according to claim 1, wherein said monomer copolymerizable with styrene of said B segment is at least one member selected from the group consisting of (meth)acrylic acids, methyl (meth)acrylates, ethyl (meth)acrylates, n-butyl (meth)acrylate, acrylonitrile, methacrylonitrile, styrene derivatives, fumaric acid derivatives, and maleic acid derivatives.

5. A low-profile unsaturated polyester resin composition according to claim 4, wherein said monomer copolymerizable with styrene is (meth)acrylic acid.

* * * * *